United States Patent [19]

Jones

[11] Patent Number: 5,122,277
[45] Date of Patent: Jun. 16, 1992

[54] MAGNETIC CONDITIONER FOR FLUID FLOW LINE

[76] Inventor: Clifford I. Jones, 1513 Kraft La., New Braunfels, Comal County, Tex. 78130

[21] Appl. No.: 504,242

[22] Filed: Apr. 4, 1990

[51] Int. Cl.⁵ .............................................. C02F 1/48
[52] U.S. Cl. .................................. 210/695; 210/222
[58] Field of Search ............. 210/222, 223, 232, 695; 55/3, 100; 123/536, 538; 335/301, 304

[56] References Cited

U.S. PATENT DOCUMENTS

| | | | |
|---|---|---|---|
| 3,170,871 | 2/1965 | Moriya | 210/222 |
| 3,187,237 | 6/1965 | Craig et al. | 335/301 |
| 3,947,533 | 3/1976 | Davis | 264/24 |
| 4,299,701 | 11/1981 | Garrett et al. | 210/222 |
| 4,414,951 | 11/1983 | Saneto | 210/222 |
| 4,428,837 | 1/1984 | Kronenberg | 210/222 |
| 4,512,289 | 4/1985 | Collins | 122/380 |
| 4,568,901 | 4/1986 | Adam | 335/305 |
| 4,601,823 | 7/1986 | Beck | 210/222 |
| 4,605,498 | 8/1986 | Kulish | 210/222 |
| 4,879,045 | 11/1989 | Eggerichs | 210/223 |
| 4,946,590 | 8/1990 | Hertzog | 210/222 |

Primary Examiner—W. Gary Jones
Assistant Examiner—Matthew O. Savage
Attorney, Agent, or Firm—Baker & Botts

[57] ABSTRACT

An apparatus and method for conditioning fluid in a flow line. A magnet is placed around a section of the flow line such that one pole, having a desired polarity, is facing the flow line. A magnetically conductive diverter band is placed around the outside of the magnet to form a loop around the magnet and thereby increase the strength of the field from the desired polarity in said flow line.

7 Claims, 6 Drawing Sheets

MAGNETIC CONDITIONER FOR FLUID FLOW LINE

TECHNICAL FIELD OF THE INVENTION

This invention relates to magnetic conditioning of fluids, and more particularly to using a magnetic field to condition fluids in a flow line.

BACKGROUND OF THE INVENTION

Magnetic treatment of fluids is a well known means for producing various effects on the fluid. For example, the application of a north magnetic field into a fluid flow line is known to prevent particulate matter from clogging the line.

Magnetic flow line conditioners can be categorized as "uni-polar" or "mono-polar" devices, which attempt to introduce only either a north or south field into the flow line, or as "bi-polar" devices, which introduce both fields. However, research has shown that certain desired results are optimized if only one polarity is introduced. The particular pole used is dictated by the treatment desired. U.S. Pat. Nos. 4,605,498, 4,568,901, and 3,947,533 each discuss various applications of magnetic conditioning for flow lines.

The device featured in U.S. Pat. No. 4,605,498 to Kulish, is typical of known devices. That device generally comprises a cylindrical casing surrounding a fluid flow line. The casing holds a plurality of magnet sections arranged to surround a part of the flow line. The strength of the applied magnetic field depends on the strength and mass of the magnet. A problem with existing devices is that they do not optimally transmit the magnetic field from the magnetic source to the fluid in the flow line. A need exists for an improved magnetic conditioner for fluid flow lines that maximizes the field strength available from a given size magnet.

SUMMARY OF THE INVENTION

An apparatus and method for conditioning fluid in a flow line. A magnet is placed around a section of the flow line such that one pole, having a desired polarity, is facing the flow line. A magnetically conductive diverter band is placed around the outside of the magnet to form a loop around the magnet and thereby increase the strength of the desired magnetic field in the flow line.

A technical advantage of the invention is that the conditioning effect of the magnet on fluid in a flow line may be intensified in a convenient and simple manner.

DETAILED DESCRIPTION OF THE INVENTION

Figure 1:
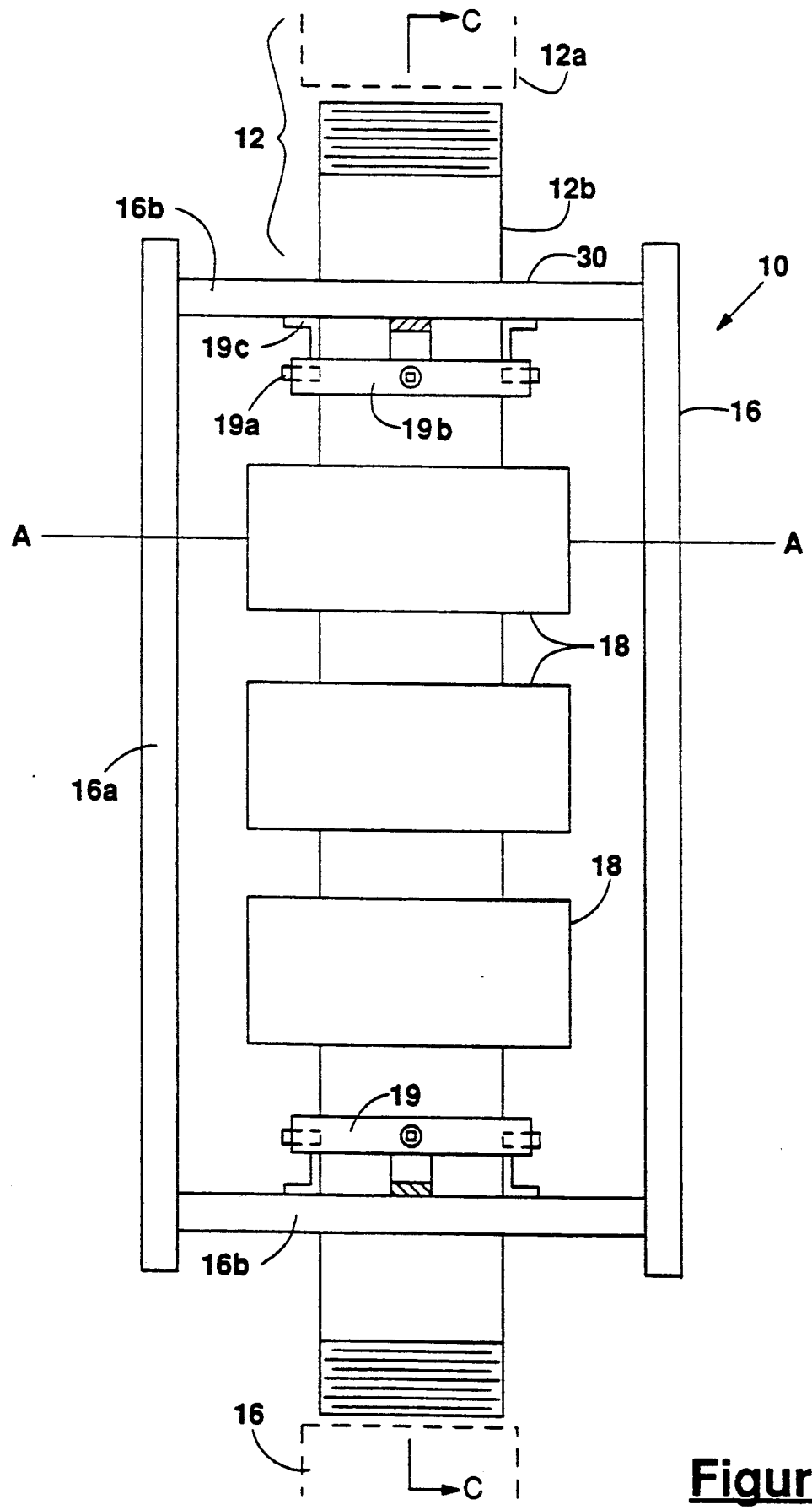
FIG. 1 is a cross sectional view of a fluid conditioner installed on a flow line.

FIG. 1 is a cross sectional view of the invention, a fluid conditioner 10, used to condition fluids flowing in a flow line 12. In FIG. 1, flow line 12 is a pipe, which is exemplary of a typical liquid-containing flow line. Flow line 12 may be any type of conduit for transporting a flow of gas, liquid, or solid slurry, and may be of any material. Furthermore, flow line need not be round, and could be any shape or size, with appropriate modifications to the size and shape of the invention, the need for which will be evident from the description below.

In the embodiment of FIG. 1, fluid conditioner 10 is installed in an existing flow line 12a by installing a flow line insert 12b, to which fluid conditioner 10 is attached. Insert 12b may be attached to flow line 12a by any convenient means. In FIG. 1, insert 12a and flow line 12b are threaded to permit a screw connection. If conditions do not permit disrupting the integrity of flow line 12, other embodiments of the fluid conditioner 10 may be designed so that it may be placed around an existing flow line 12. If a flow line insert 12b such as is shown in FIG. 1 is used, for purposes of explanation herein, both flow line 12a and insert 12b are referred to as flow line 12.

Figure 2:
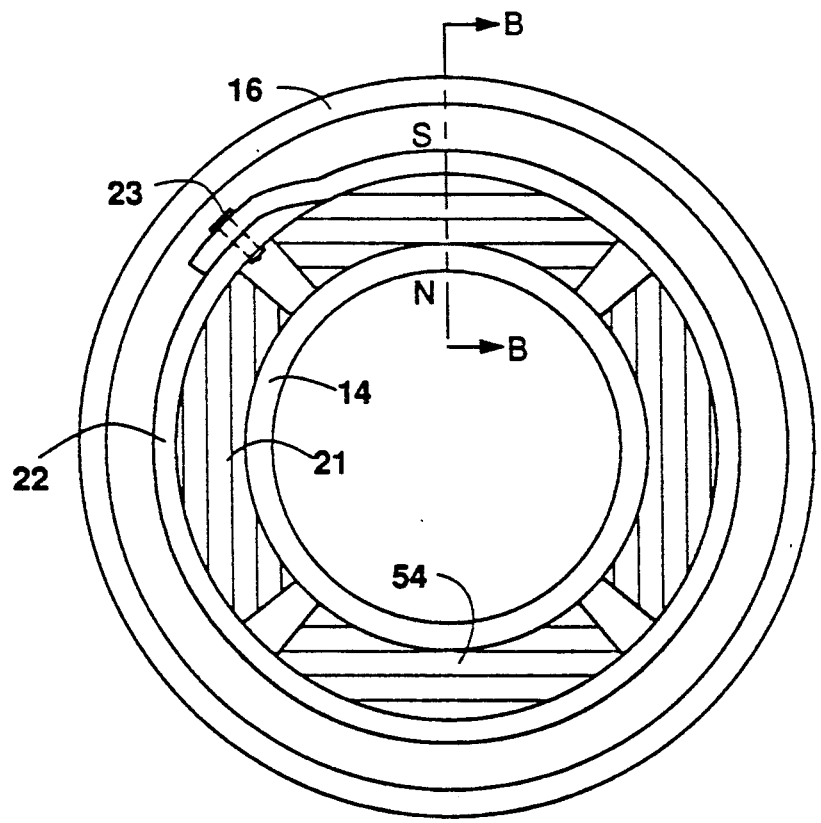
FIG. 2 is a cross sectional view of the fluid conditioner of FIG. 1, along section lines A—A.

FIG. 2 is a cross sectional view of the flow line conditioner of FIG. 1, along section lines A—A. Referring to both FIGS. 1 and 2, in addition to insert 12b, fluid conditioner 10 comprises a housing 16 and a series of magnetic conditioner rings 18.

Housing 16 may be any size or shape sufficient to enclose and protect conditioner rings 18. The size and shape of housing 16 may depend, for example, on the number of conditioner rings 18 and the size of flow line 12. Housing 16 is essentially a cylindrical tube 16a with an end piece 16b at each end. Housing 16 is attached to flow line 12 by any convenient means. FIG. 1 shows this attachment by means of a collar fastener 19 at each end comprised of set screws 19a, collar 19b, and tabs 19c. Other attachment means, such as welding, could also be used. As explained below, it may be advantageous to have an attachment means that permits magnetic conduction between flow line 12 and housing 16.

As will be explained below, if flow line 12 is made from a magnetically conductive material, housing 16 may serve a second function in addition to housing conditioner rings 18. More specifically, housing 16 may also provide a means for increasing the strength of the desired magnetic field inside flow line 12. If this is the case, housing 16 is made from a magnetically conductive material and the attachment of housing 16 to flow line 12 permits magnetic conduction between housing 16 and flow line 12.

Conditioner rings 18 are spaced along flow line 12, with three such conditioner rings 18 being illustrated in FIG. 1. Each conditioner ring 18 is comprised of a magnet 21 and a diverter band 22. Each diverter band 22 is placed directly against the outer surface of its corresponding magnet 21.

In the embodiment of FIG. 2, each magnet 21 is in four sections, which surround flow line 12. However, dividing magnet 21 into sections is not a necessary feature and is a manufacturing convenience that facilitates providing a ring-shaped magnet around flow line 12.

Also, the use of sections for magnet 21 permits the same sections to be used with varying diameters of flow line 12. However, magnet 21 could also be a solid ring through which flow line 12 is inserted.

In FIG. 2, each magnet is polarized with the north pole against flow line 12, however, the polarity could be the opposite for different applications. In other words, the polarity of magnets 21 is not material, and the main advantage of the invention is that regardless of polarity, the strength of the magnetic field into flow line 12 is optimized. It is assumed, however, that the polarity of each magnet with respect to flow line 12 is the same.

Magnets 21 are shown in FIG. 2 as permanent magnets. However, this is not a limitation of the invention and electromagnets may also be used. Magnets 21 may be any type of commonly available magnet, such as ceramic magnets. Magnets are securely attached to flow line 12 by means of glue or some other fastening agent or device. The size and strength of magnets 21 may vary according to the desired effect, however, a feature of the invention is that the magnetic field strength inside flow line 12 is a function of the diverter bands 22, as well as the size and strength of the magnets 21.

Each diverter band 22 is a magnetically conductive strip of material, which is in contact with the outer surface of its corresponding magnet 21. The function of diverter band 22, to increase the magnetic field inside flow line 12, is a basic feature of the invention. For maximum effect, diverter band 22 is of a ferromagnetic substance.

In the preferred embodiment, diverter band 22 forms a complete loop around magnet 21 and covers the entire surface of magnet 21. However, as explained below, diverter band 22 is also functional to a lesser extent if it does not completely cover magnet 21. Also, although a single opening in diverter band 22, resulting in an open loop, reduces the functionality of the invention, the functionality is increasingly diminished as the number of such openings increases.

The "loop" shape of diverter band 22 could be any closed path and need not necessarily be circular. For example, if flow line 12 is not circular, diverter band would conform to the outer surface of flow line 12. Also, for manufacturing convenience, diverter band 22 could be in more than one piece, or could be a partial band with a closing bridge piece.

Referring to FIG. 2, each diverter band 22 is placed and held against its corresponding magnet 21 by any convenient means. As stated above, the use of sections for magnet 21 permits magnet 21 to surround flow line 12 by being placed in sections alongside flow line 12. Consistent with this approach to manufacture, diverter band 22 is a band of material that may be wrapped around magnet 21 once magnet 21 is attached to flow line 12. In FIG. 2, the securing of diverter band 22 against magnet 21 is accomplished with a pop rivet 23. Each pop rivet 23 is magnetically non-conductive and is placed in an air space between sections of magnet 21. This eliminates the risk of a short circuit from flow line 12 to diverter band 22, for reasons that will be explained below.

As stated above, an advantage of the invention is that it optimizes the magnetic field strength available from magnet 21. This is best understood in connection with the following discussion of magnetic fields and the accompanying FIGS. 3-6. In the discussion below, the various magnetic field effects were experimentally obtained.

Figure 3:
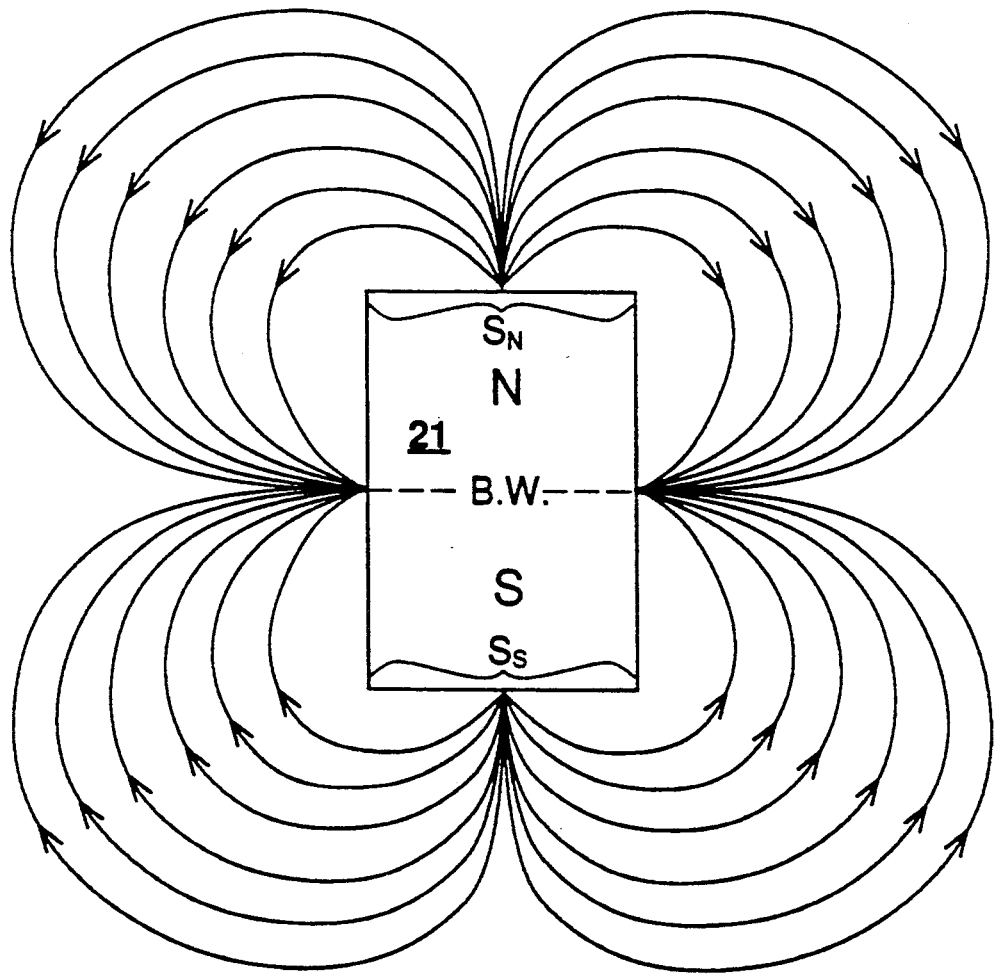
FIG. 3 is a cross sectional view of a magnet, such as the magnet illustrated in FIGS. 1 and 2, and illustrates the magnetic field lines from that magnet, with no other field influences.

FIG. 3 is a cross sectional view of magnet 21 along section lines B—B of FIG. 2. In FIG. 3, flow line 12, housing 16, and diverter band 22 have been removed to illustrate the magnetic field of a typical magnet in space. The north and south poles of magnet 21 are labelled N and S, respectively. The maximum field strength is at each pole surface, which are referred to herein as the magnet heads and are labeled $S_N$ and $S_S$. As the distance from this surface increases, the field strength decreases.

In magnetic technology, the north and south poles are often referred to as the "south-seeking" and "north-seeking" poles, respectively. However, this terminology is somewhat misleading because, as shown in FIG. 3, the flux lines of each pole actually trace to a "block wall" (BW). This block wall may be thought of as an imaginary line bisecting magnet 21 between its poles. The flux lines flowing to the block wall from each pole enter the block wall at a perpendicular angle to magnet 21.

Figure 4:
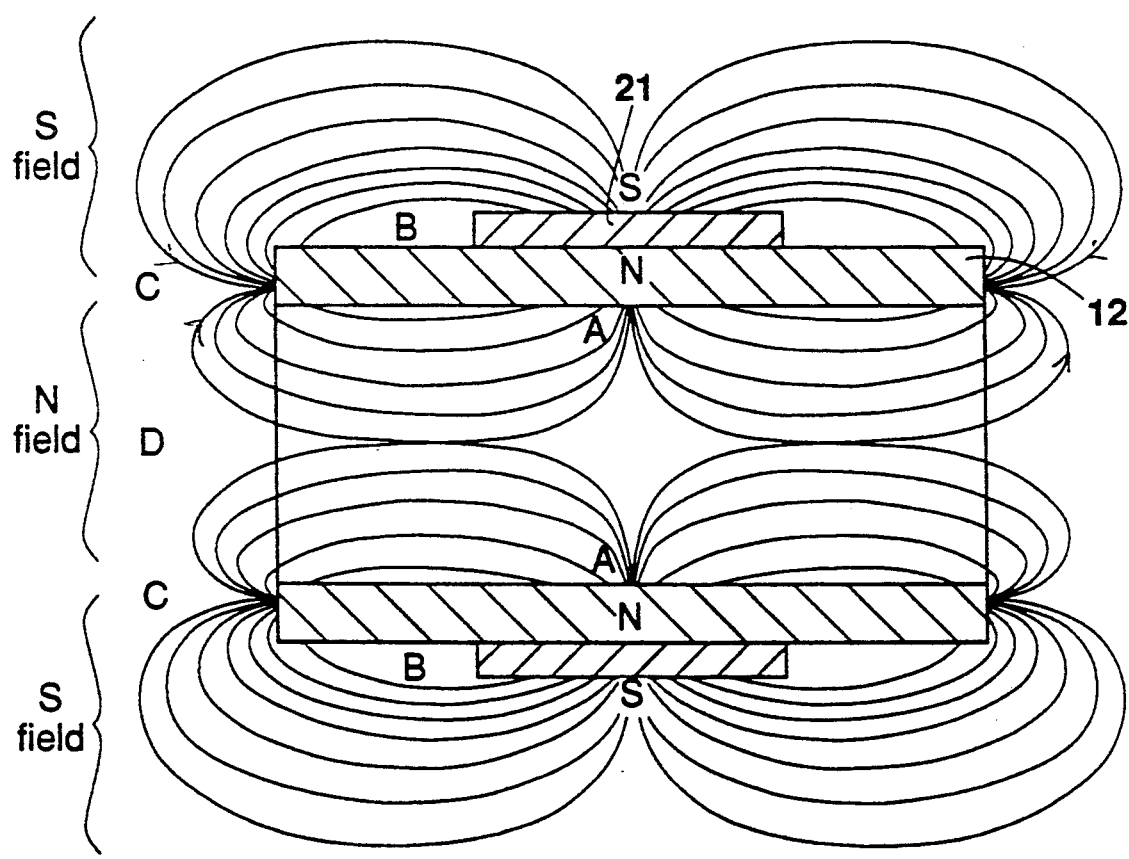
FIG. 4 is a longitudinal cross sectional view of a single magnet surrounding a pipeline, such as illustrated in FIGS. 1 and 2, showing the magnetic field lines.

FIG. 4 illustrates the flux lines of magnet 21 surrounding a magnetically conductive flow line 12. FIG. 4 is equivalent to a longitudinal cross section of the fluid conditioner of FIG. 1, along section lines C—C, except that only a single magnet 21, and not housing 16 or diverter band 22, is shown.

Magnet 21 is polarized so that its north pole is in contact with the surface of flow line 12. This is for purposes of example, and the polarity of magnet 21 could be reversed. The field effects would be the same, although the effect on the fluid in flow line 12 would be different.

Several significant characteristics of the magnetic field may be noted. First, as indicated by the reference letter A in FIG. 4, a strong north field is on the interior wall of flow line 12 at magnet 21. Second, as indicated by reference letter B, a strong north field is on the exterior wall of flow line 12. Third, as indicated by reference letter C, a weak field is on the ends of flow line 12 at the block wall. This field is difficult to separate into north and south. Fourth, as indicated by reference letter D, a weak north field emanates from the center of flow line 12 at its ends. The terms "strong" and "weak" with respect to portions of the magnetic field of magnet 21 refer to the strength of these portions relative to each other. As will be explained below, one advantage of the invention is to increase the field strength within flow line 12, and changes in the field at A,B,C, and D indicate this desired result.

Figure 5:
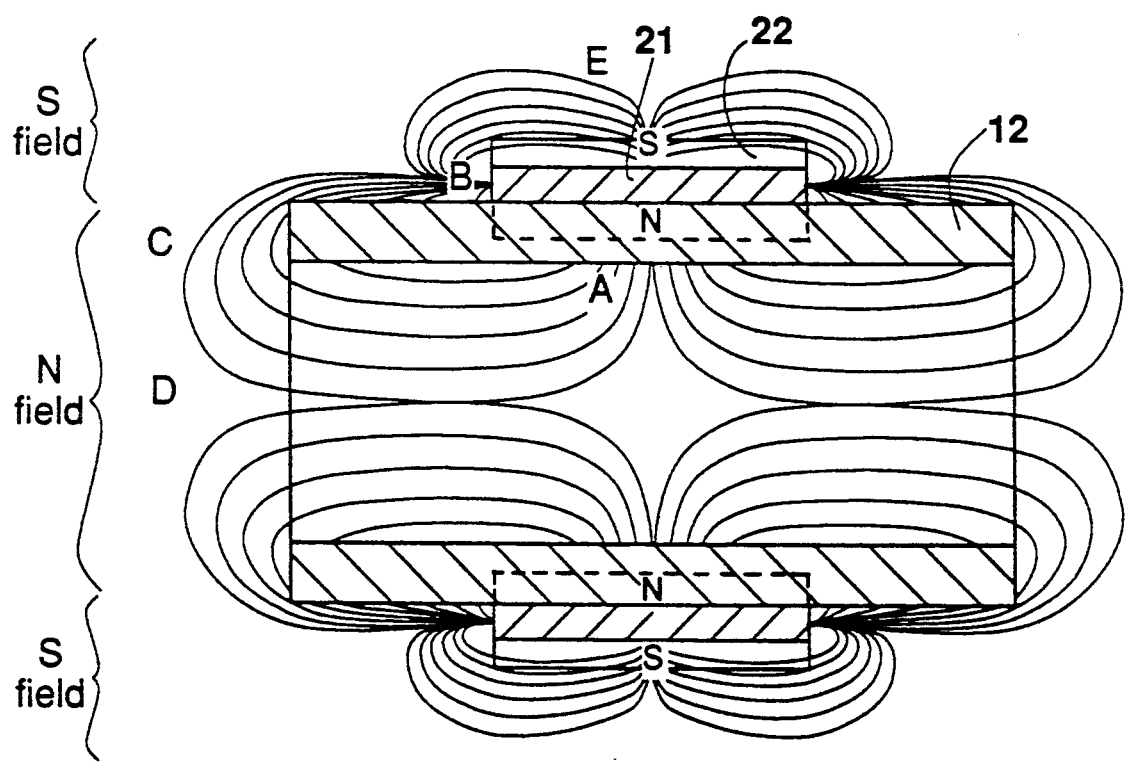
FIG. 5 illustrates the magnet of FIG. 4 with a diverter band and shows the effect of the diverter band on the magnetic field.

If flow line 12 is magnetically conductive, another effect of magnet 21 is the shifting of the block wall into flow line 12. This is undesired because it introduces south field into flow line 12. As explained below, another advantage of the invention is that it counteracts this effect. FIG. 5 illustrates an underlying concept of the invention—that the flux lines set up by magnet 21 can be altered by using diverter band 22. Thus, FIG. 5 illustrates the magnet 21 of FIG. 4, but with the addition of diverter band 22. The magnetic field now exhibits several changed characteristics from the field of FIG. 4. First, the strength of the north field on the interior of flow line 12 at the location of magnet 21 (at A) is increased. As indicated by the dotted lines, the effective north magnet head is shifted toward the inside of flow line 12. This increases the total north field strength inside flow line 12. Second, the strength of the north field on the exterior surface of flow line 12 (at B) is decreased due to the fact that the block wall is now closer to the exterior surface of flow line 12. This decreased field at B indicates that less magnetism is being conducted by flow line 12 instead of being directed inside flow line 12. Third, the strength of the field at each end of flow line 12 (at C) is increased. This field is now detectable as north field. Fourth, a stronger north field emanates from the center of flow line 12 and out its ends (at D). This indicates a stronger magnetic effect on the fluid inside flow line 12. Fifth, as indicated by reference letter E, a strong south field is on the outer surface of diverter band 22, but does not radiate far from diverter band 22. The block wall is relocated up and away from the exterior surface of flow line 12.

The overall effect of placing diverter band 22 around magnet 21 is that certain field effects are re-directed. In the example of FIG. 5, the south magnetic field is inhibited from emanating radially outward from diverter band 22. In a sense, the flux lines of the south field are "shorted" by diverter band 22. With respect to the magnetic field inside flow line 12, diverter band 22 prevents the undesired south magnetic field from neutralizing the desired north field. Instead of flowing to the block wall, some of the flux lines are directed along the path established by diverter band 22.

When the path is a closed loop, the flux lines from the pole closest to diverter band 22, i.e., the "diverter facing pole", tend to flow in a continuous and circular manner around and away from the opposite pole, i.e., the "fluid facing pole". This makes it more difficult for the flux lines from the diverter facing pole to return to the block wall. The result is that the effective head of magnet 21 is further inside flow line 12. The field strength inside flow line 12 is then stronger and penetrates further into the fluid inside flow line 12.

As stated above, diverter band 22 need not necessarily form a closed loop around magnet 21, although a closed loop is preferred. Regardless of whether the diverted flux resulting from diverter band 22 is directed around a closed loop, or to the air, as in the case of an open loop, the general benefit is the same. The undesired field is redirected away from flow line 12.

Figure 6:
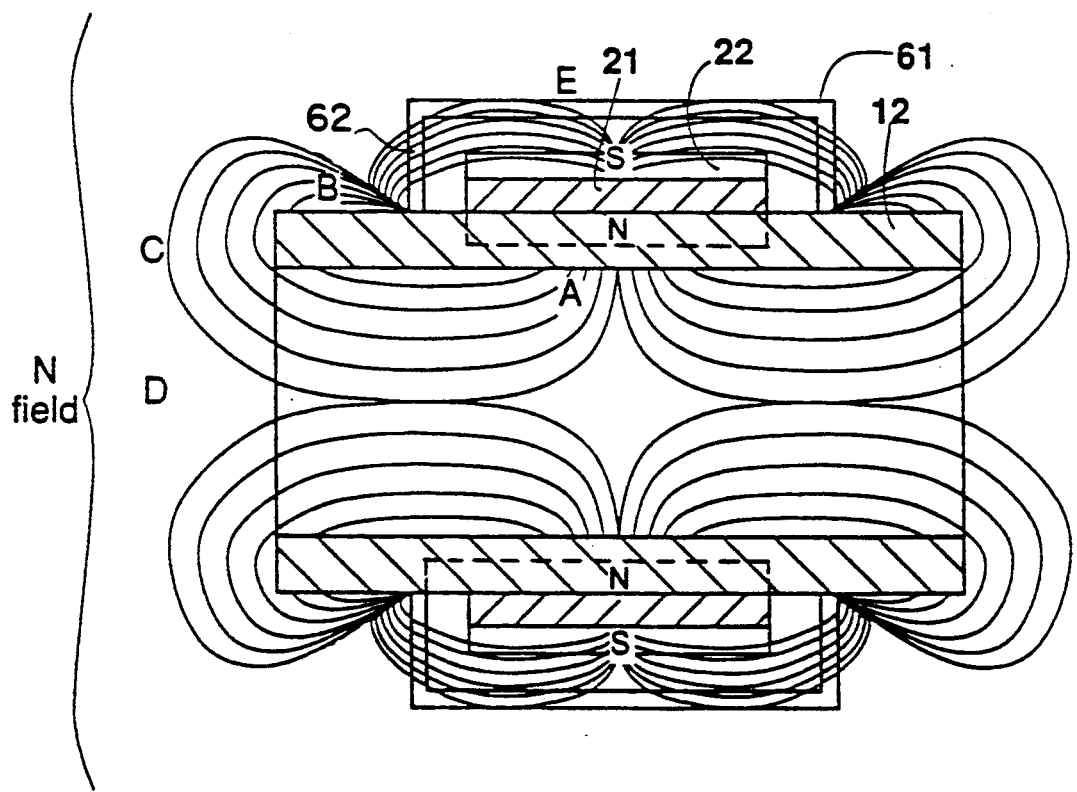
FIG. 6 illustrates the magnet and diverter band of FIG. 5, as well as a secondary diverter band, and shows the effect of using both diverter bands on the magnet field.

FIG. 6 illustrates an additional benefit that can be obtained by using a secondary diverter band 61. Like diverter band 22, secondary diverter band 61 is made from a magnetically conductive material. Secondary diverter band 61 is placed over diverter band 22 such that it does not touch diverter band 22. Also, secondary diverter band has extensions 62 at each end so that it touches flow line 12 on both sides of magnet 21. Housing 16 may serve as secondary diverter band 61 when made of a magnetically conductive material.

The use of secondary diverter band 61 affects the field in the manner shown in FIG. 6. As compared to the field of FIG. 5, the north field on the interior wall of flow line 12 at the location of magnet 21 (at A) is increased. The north field at the exterior of flow line 12 (at B) is weaker. The north flux field strength at the ends of flow line 12 (at C) is increased. An increased north field is in the interior of flow line 12 at its ends (at D). The south field on the surface of secondary diverter 61 is very weak (at E). The block wall is farther away from flow line 12, with its origin at the juncture of secondary diverter band 61 and flow line 12.

The overall effect of secondary diverter band 61 is analogous to the overall effect of diverter band 22. The undesired south field is directed around secondary diverter band 61, with the result that the south field has less influence on the desired north field inside flow line 12

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. An apparatus for conditioning fluid flowing in a flow line, comprising:
    a flow tube for replacing a section of a flow line;
    a magnet for attachment to and surrounding of said flow tube, said magnet being polarized such that one pole is facing said flow tube;
    a first diverter band surrounding said magnet directly against said magnet;
    a second diverter band surrounding said magnet and said first diverter band, spaced from said first diverter band and attached to said flow tube;
    wherein said diverter bands are made from a magnetically conductive material, and form a complete and continuous loop around said flow tube.

2. The conditioner of claim 1, and further comprising a plurality of said magnets and said first and said second diverter bands spaced along said flow tube.

3. The conditioner of claim 1, and further comprising a plurality of said magnets and said first diverter bands, and wherein said second diverter band is a housing for said magnets and said first diverter bands.

4. The conditioner of claim 3, wherein said housing and said flow tube form a continuous circuit for conducting said magnetic field.

5. A method for conditioning fluid in a flow line, comprising the steps of:
    introducing a desired magnetic field polarity within a flow line by placing one pole of a magnet against a section of said flow line;
    maximizing the intensity of said desired magnetic field polarity by placing a first magnetically conductive diverter band around said magnet such that the undesired magnetic field polarity from said magnetic is shorted around said diverter band; and
    further maximizing the intensity of said desired magnetic field polarity by placing a second magnetically conductive diverter band around said magnet, spaced outside said first diverter band.

6. The method of claim 5, wherein said step of further maximizing the intensity of said magnetic field includes using said secondary diverter band to form a complete magnetically conductive circuit that includes said flow line.

7. An apparatus for magnetically conditioning a fluid flowing in a flow line, comprising:
    magnet means for providing an inner magnetic field and an outer magnetic field, said inner magnetic field being concentrated on a central axis for providing magnetic treatment of a fluid contained within said flow line located coaxially along said central axis and within said inner magnetic field;
    a diverter band surrounding said magnet means, in said outer magnetic field, made from a magnetically conductive material, for minimizing the effect of said outer magnetic field along said central axis; and
    a tubular housing surrounding said diverter band having a pair of opposed open ends;

an end piece attached to each of said opposed open ends;

each said end piece including means for connecting said housing to said flow line located coaxially along said central axis;

wherein said housing, each said end piece, and each said means for connecting the housing to said flow line is made of a magnetically conductive material.

* * * * *